(12) United States Patent
Watters et al.

(10) Patent No.: US 8,494,974 B2
(45) Date of Patent: Jul. 23, 2013

(54) TARGETED SECURITY IMPLEMENTATION THROUGH SECURITY LOSS FORECASTING

(75) Inventors: John P. Watters, Dallas, TX (US); Frederick Doyle, Albuquerque, NM (US)

(73) Assignee: iSIGHT Partners Inc., Dallas, TX (US)

( * ) Notice: Subject to any disclaimer, the term of this patent is extended or adjusted under 35 U.S.C. 154(b) by 543 days.

(21) Appl. No.: 12/689,160

(22) Filed: Jan. 18, 2010

(65) Prior Publication Data

US 2011/0178942 A1 Jul. 21, 2011

(51) Int. Cl.
*G06Q 99/00* (2006.01)

(52) U.S. Cl.
USPC .......................................................... 705/325

(58) Field of Classification Search
USPC ........................ 705/1.1, 7, 500, 325
See application file for complete search history.

(56) References Cited

U.S. PATENT DOCUMENTS

| | | | |
|---|---|---|---|
| 6,947,978 B2 | 9/2005 | Huffman et al. | |
| 7,234,168 B2 | 6/2007 | Gupta et al. | |
| 7,293,287 B2 | 11/2007 | Fischman et al. | |
| 7,308,715 B2 | 12/2007 | Gupta et al. | |
| 7,409,714 B2 | 8/2008 | Gupta et al. | |
| 7,624,444 B2 | 11/2009 | Gupta et al. | |
| 7,958,027 B2 | 6/2011 | Lawrence | |
| 8,010,469 B2 | 8/2011 | Kapoor et al. | |
| 8,091,065 B2 | 1/2012 | Mir et al. | |
| 8,132,260 B1 | 3/2012 | Mayer et al. | |
| 8,135,657 B2 | 3/2012 | Kapoor et al. | |
| 8,250,651 B2 | 8/2012 | Huang et al. | |
| 8,272,053 B2 | 9/2012 | Markham et al. | |
| 2003/0009699 A1 | 1/2003 | Gupta et al. | |
| 2003/0051026 A1 | 3/2003 | Carter et al. | |
| 2003/0056116 A1 | 3/2003 | Bunker, V et al. | |
| 2003/0097588 A1 | 5/2003 | Fischman et al. | |
| 2003/0177376 A1 | 9/2003 | Arce Velleggia et al. | |
| 2003/0233319 A1 | 12/2003 | Lawrence | |
| 2005/0210275 A1 | 9/2005 | Homing et al. | |
| 2006/0015941 A1 | 1/2006 | McKenna | |
| 2006/0031940 A1 | 2/2006 | Rozman et al. | |

(Continued)

FOREIGN PATENT DOCUMENTS

WO     2009083036 A1    7/2009

OTHER PUBLICATIONS

Office Action dated May 3, 2012, U.S. Appl. No. 12/132,327, filed Jun. 3, 2008.

(Continued)

*Primary Examiner* — Jami A Plucinski
*Assistant Examiner* — Michael Thompson

(57) ABSTRACT

A method of selecting security actions is provided. The method comprises estimating a maximum forecast loss, identifying general, sector specific, and targeted threats. The method further comprises forecasting a security loss based on the estimated maximum forecast loss and the threats, estimating a reduction in the security loss based on a first investment on a general threat countermeasure, on a second investment on a sector specific countermeasure, and on a third investment on a targeted threat countermeasure. The method further comprises allocating at least a portion of a security investment budget among the first, the second, and the third investments to maximize the estimated reduction in security loss. An aspect disclosed comprises a method that determines rates of return on security investment and selects security investments based on the rates of return. An aspect disclosed comprises a system for forecasting a security loss based on a security investment.

11 Claims, 7 Drawing Sheets

U.S. PATENT DOCUMENTS

| | | | |
|---|---|---|---|
| 2006/0059557 | A1 | 3/2006 | Markham et al. |
| 2006/0080637 | A1 | 4/2006 | Treit et al. |
| 2006/0117386 | A1 | 6/2006 | Gupta et al. |
| 2006/0191007 | A1 | 8/2006 | Thielamay |
| 2007/0006315 | A1 | 1/2007 | Bushnaq |
| 2007/0100642 | A1* | 5/2007 | Paulus et al. ............ 705/1 |
| 2007/0113281 | A1* | 5/2007 | Leach ............... 726/22 |
| 2007/0180522 | A1 | 8/2007 | Bagnall |
| 2007/0180525 | A1 | 8/2007 | Bagnall |
| 2007/0186284 | A1 | 8/2007 | McConnell |
| 2007/0192859 | A1 | 8/2007 | Shahar et al. |
| 2007/0192867 | A1 | 8/2007 | Miliefsky |
| 2007/0240217 | A1 | 10/2007 | Tuvell et al. |
| 2007/0251988 | A1 | 11/2007 | Ahsan et al. |
| 2008/0028470 | A1 | 1/2008 | Remington et al. |
| 2008/0082380 | A1 | 4/2008 | Stephenson |
| 2009/0099885 | A1* | 4/2009 | Sung et al. ............ 705/7 |
| 2009/0178139 | A1 | 7/2009 | Stute et al. |
| 2009/0300589 | A1 | 12/2009 | Watters et al. |
| 2010/0235918 | A1 | 9/2010 | Mizrahi et al. |
| 2011/0173699 | A1 | 7/2011 | Figlin et al. |
| 2011/0252479 | A1* | 10/2011 | Beresnevichiene et al. .... 726/25 |
| 2012/0072983 | A1 | 3/2012 | McCusker et al. |

OTHER PUBLICATIONS

Foreign Communication From a Related Counterpart Application—International Search Report and Written Opinion, PCT/US2009/042006, Jun. 19, 2009, 11 pages.

Stewart, Joe, "Truman—The Reusable Unknown Malware Analysis Net," SecureWorks, Version 2, Jun. 1991, 1 page.

Wikipedia, "Bayesian Inference," http://en.wikipedia.org/w/index.php?title=Bayesian_inference&printable=yes, May 15, 2008, 12 pages.

Wikipedia, "Botnet," http://en.wikipedia.org/w/index.php?title=Botnet&printable=yes, May 11, 2008, 6 pages.

Watters, John P., et al., Patent Application entitled, "Information System Security Based on Threat Vectors", filed Mar. 7, 2011, U.S. Appl. No. 13/042,066.

Final Office Action dated Aug. 8, 2012, U.S. Appl. No. 12/132,327, filed Jun. 3, 2008.

Office Action dated Aug. 8, 2012, U.S. Appl. No. 13/042,066, filed Mar. 7, 2011.

Foreign Communication From a Related Counterpart Application—European Search Report, European Application No. 12158396.7, Apr. 6, 2012, 6 pages.

Notice of Allowance dated Jan. 10, 2013, U.S. Appl. No. 13/042,066, filed Mar. 7, 2011.

\* cited by examiner

| THREAT SCORING (IMPACT ON CURVE) | | | | | | |
|---|---|---|---|---|---|---|
| THREAT INNOVATION | GEN | COL | MOR | LAU | TOT | SCALE |
| GENERAL | | | | | | |
| PROLIFERATION OF TRANSIENT ROGUE HOSTING SERVICES | 2 | 0 | 0 | 0 | 2 | |
| INCREASED GEOGRAPHIC AND FUNCTIONAL TARGETING OF MALWARE PAYLOADS | 0 | 1 | 1 | 0 | 2 | |
| DISPOSABLE DDOS BOTNET INFRASTRUCTURE | 2 | 0 | 0 | 0 | 2 | |
| INCREASING NUMBER OF CASES INVOLVING SOPHISTICATED LONG TERM RECONNAISSANCE AND INTRUSION CAMPAIGNS | 4 | 0 | 0 | 0 | 4 | |
| DATA MINING OF CUSTOMER INFORMATION TO SUPPORT "BLACK CREDIT BUREAU" ACTIVITY | 1 | 0 | 0 | 1 | 2 | |
| INCREASING CONTRACT INTRUSION AGAINST THIRD PARTY ENTERPRISE APPLICATIONS | 0 | 1 | 1 | 0 | 2 | |
| SUBVERSION OF OUTSOURCED FREELANCE DEVELOPMENT MARKETPLACES | 1 | 2 | 0 | 0 | 3 | |
| INCREASED ADVERSARY DENIAL & DECEPTION | 1 | 0 | 0 | 1 | 2 | |
| INCREASING CYBER THREAT INTERESTS BY ANTI-CORPORATE RADICALS | 1 | 0 | 0 | 0 | 1 | |
| SUB TOTAL: | 12 | 4 | 2 | 2 | 20 | 42 |
| SECTOR SPECIFIC | | | | | | |
| INCREASED ARBITRARY TESTING AND DISCUSSION OF ANTI-FRAUD COUNTERMEASURE THRESHOLDS ON A SYSTEMATIC BASIS | 1 | 1 | 0 | 0 | 2 | |
| UTILIZATION OF PROXY BOTNET INFRASTRUCTURE TO DEFEAT ANTI-FRAUD COUNTERMEASURES | 0 | 1 | 1 | 0 | 2 | |
| INCREASING THREAT OF SINGLE ISSUE DDOS ATTACKS | 1 | 0 | 0 | 0 | 1 | |
| EXPANSION AND COMMERCIALIZATION OF REGIONAL CRIME MARKETPLACE ACTIVITIES, ESPECIALLY WITHIN MIDDLE EAST THREAT GROUPS | 0 | 0 | 1 | 1 | 2 | |
| SUB TOTAL: | 2 | 2 | 2 | 1 | 7 | 21 |
| TARGETED | | | | | | |
| AFFILIATE SCHEMES | 1 | 0 | 2 | 0 | 3 | |
| HIGH-TURNOVER MULE NETWORKS | 1 | 0 | 0 | 2 | 3 | |
| MULTI-COUNTRY HOP MULE NETWORKS | 1 | 0 | 0 | 1 | 2 | |
| COUNTERFEITING OF LUXURY GOODS | 2 | 0 | 0 | 0 | 2 | |
| MASS MARKET MALWARE (E.G. ZEUS) | 1 | 4 | 1 | 1 | 7 | |
| ESCROW FRAUD | 2 | 1 | 2 | 0 | 5 | |
| BAD ECONOMY INCREASING ONLINE PETTY CRIME | 3 | 0 | 0 | 0 | 3 | |
| GROWING CAPABILITIES IN DDOS-FOR-HIRE | 2 | 0 | 0 | 0 | 2 | |
| CLICK FRAUD | 1 | 0 | 2 | 0 | 3 | |
| SUB TOTAL: | 14 | 5 | 7 | 4 | 30 | 54 |
| INDEFENSIBLE | | | | | | |
| TOTAL INDEFENSIBLE | 0 | 0 | 0 | 0 | 0 | |
| SUB TOTAL: | 0 | 0 | 0 | 0 | 0 | 0 |
| GRAND TOTALS: | 28 | 11 | 11 | 7 | 57 | 117 |

*FIG. 3*

| COUNTERMEASURE SCORING (IMPACT ON CURVE) | | | | | | RESIDUAL | |
|---|---|---|---|---|---|---|---|
| COUNTERMEASURE | GEN | COL | MOR | LAU | TOT | ARITHMETIC | ACTUAL |
| GENERAL | | | | | | | |
| IS/TSB/MTR | 1 | 0 | 0 | 0 | 1 | 1 | 1 |
| IS/TSB/MTR | 1 | 0 | 0 | 0 | 1 | 1 | 1 |
| IS/TSB/MTR | 1 | 0 | 0 | | 1 | 1 | 1 |
| IS/TSB/MTR | 1 | 0 | 0 | 0 | 1 | 3 | 3 |
| IS/TSB/MTR | 1 | 0 | 0 | 0 | 1 | 1 | 1 |
| IS/TSB/MTR | 1 | 0 | 0 | 0 | 1 | 1 | 1 |
| IS/TSB/MTR | 1 | 0 | 0 | 0 | 1 | 2 | 2 |
| IS/TSB/MTR | 1 | 0 | 0 | 0 | 1 | 1 | 1 |
| IS/TSB/MTR | 1 | 0 | 0 | 0 | 1 | 0 | 0 |
| SUB TOTAL: | | | | | 9 | 11 | 11 |
| SECTOR SPECIFIC | | | | | | | |
| TSP | 1 | 0 | 0 | 0 | 1 | 1 | 1 |
| TSP | 1 | 0 | 0 | 0 | 1 | 1 | 1 |
| TSP | 1 | 0 | 0 | 0 | 1 | 0 | 0 |
| TSP | 1 | 0 | 1 | 1 | 3 | -1 | 0 |
| SUB TOTAL: | | | | | 6 | 1 | 2 |
| TARGETED | | | | | | | |
| AFFILIATE FRAUD EC4 | 1 | 0 | 1 | 0 | 2 | 1 | 1 |
| UPCOMING ROMANIAN EC4/ THREATSCAPE MONITORING | 0 | 0 | 0 | 0 | 0 | 3 | 3 |
| UPCOMING ROMANIAN EC4 | 0 | 0 | 0 | 0 | 0 | 2 | 2 |
| CHINESE GRMC MONITORING | 2 | 2 | 0 | 0 | 4 | -2 | 0 |
| THREATSCAPE/INTELLISIGHT MONITORING | 1 | 1 | 1 | 1 | 4 | 3 | 3 |
| UPCOMING ROMANIAN EC4 | 0 | 0 | 0 | 0 | 0 | 5 | 5 |
| THREATSCAPE MONITORING | 1 | 0 | 1 | 1 | 3 | 0 | 0 |
| DDOS EC4 ENGAGEMENT | 1 | 0 | 1 | 0 | 2 | 0 | 0 |
| AFFILIATE FRAUD EC4 | 2 | 0 | 1 | 0 | 3 | 0 | 0 |
| SUB TOTAL: | 8 | 3 | 5 | 2 | 18 | 12 | 14 |
| INDEFENSIBLE | | | | | | | |
| TOTAL INDEFENSIBLE | 0 | 0 | 0 | 0 | 0 | 0 | 0 |
| SUB TOTAL: | 0 | 0 | 0 | 0 | 0 | 0 | 0 |
| GRAND TOTAL: | 21 | 3 | 6 | 3 | 33 | 24 | 27 |

TARGETED SECURITY IMPLEMENTATION THROUGH SECURITY LOSS FORECASTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Corporations and other organizations are vulnerable to a variety of threats. If a threat is actualized in the form of an attack, the organization may lose considerable value. Attacks can result in a direct loss of money, loss of confidential information which later can be monetized, loss of infrastructure availability, loss of data integrity, loss of customer confidence, loss of brand value, and other losses. Attacks may take a variety of forms including, but not limited to, employee theft, embezzlement, robbery, sabotage, infection with computer viruses, compromised credit card accounts, database invasions, and others. As tactics for thwarting and parrying attacks are developed and implemented by organizations, new attacks are devised and attempted by bad actors.

SUMMARY

In an embodiment, an automated method of selecting security actions is disclosed. The method comprises estimating a maximum forecast loss based on a valuation of an organization, identifying a plurality of general threats that threaten the organization, identifying a plurality of sector specific threats that threaten the organization, and identifying a plurality of targeted threats that threaten the organization. The method further comprises a computer forecasting a security loss based on the estimated maximum forecast loss, based on the general threats, based on the sector specific threats, and based on the targeted threats, estimating a reduction in the security loss based on a first investment in a countermeasure directed to the general threats, estimating a reduction in the security loss based on a second countermeasure directed to the sector specific threats, and estimating a reduction in the security loss based on a third countermeasure directed to the targeted threats. The method further comprises the computer allocating at least a portion of a security investment budget among the first investment, the second investment, and the third investment to maximize the estimated reduction in security loss.

In an embodiment, a method of selecting security investments is disclosed. The method comprises estimating a maximum forecast loss based on a valuation of an organization and identifying a plurality of threats that threaten the organization, wherein each of the threats is associated with one of a plurality of threat zones. The method further comprises determining a forecast loss versus security investment function based at least in part on the estimated maximum forecast loss and on the threats, determining an operating point of the organization versus the forecast loss versus security investment function based on a security spending by the organization and determining a rate of return for incremental security spending based on the forecast loss versus security investment function, based on the operating point of the organization versus the forecast loss versus security investment function. The method further comprises, based on the determined rate of return, adjusting the security spending.

In an embodiment, a system for forecasting a security loss is disclosed. The system comprises a computer system, a memory coupled to the computer system, and an application stored in the memory that executes on the computer. When executed, the application determines a maximum forecast loss based on a valuation of an organization and analyzes a plurality of threats associated with the organization, wherein each of the threats is associated with one of a plurality of threat zones. The threat zones comprise a general threat zone, a sector specific threat zone, and a targeted threat zone. The application further determines a relative magnitude of threats distributed among the threat zones based on the analysis of the threats, identifies deployed threat countermeasures, and determines a forecast loss versus security investment curve based at least in part on the deployed threat countermeasures, on the analysis of threats, and on the maximum forecast loss. The application further presents the forecast loss versus security investment curve on a display and presents a representation of the relative magnitude of threats distributed among the threat zones on the display, whereby a rate of return for a security investment is visualized.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is an illustration of a threat score according to an embodiment of the disclosure.

FIG. 4 is an illustration of a countermeasures score according to an embodiment of the disclosure.

DETAILED DESCRIPTION

Figure 1:
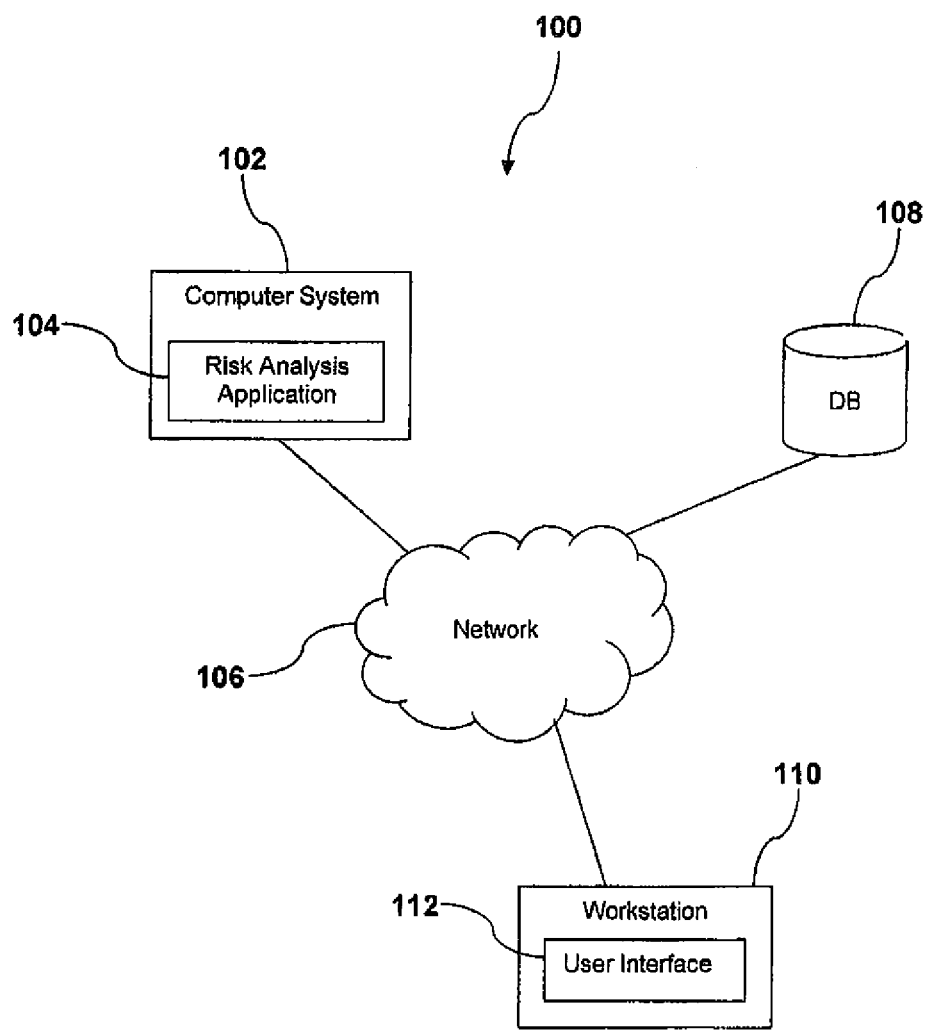
FIG. 1 is a block diagram of a system for forecasting a security loss according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A computer based system for analyzing threats, risks, and security investments to visualize the tradeoffs between different security investment strategies is disclosed. The system receives input on how security investment money is being spent and analyzes how much this investment has reduced risk. The system takes account of the different exposures associated with different threat zones and/or threat categories. The system promotes determining a local return on investment for incremental investment in security measures at a given current level of security investment. The system promotes testing alternative security investment strategies and/or different distributions of a limited security budget to identify an optimal or near optimal security investment strategy and/or allocation of a security budget. In some contexts, the computer based system may be referred to as an automated system that provides automated solutions.

The present disclosure teaches a system and methods for analyzing and visualizing quantitatively the effects of investment in threat countermeasures, threat mitigations, and/or security measures, which all may be referred to as security investments. The system may comprise a computer system and an application stored in a memory of a computer system that executes on the computer system to analyze and subsequently to display the quantization of the effects of security investments. The application determines a relationship between a forecast loss to an organization and/or a risk versus a security investment by the organization over a time interval, for example over a year or over a quarter of a year, and presents the relationship in the form of a curve, for example a decaying exponential curve or other curve. In some contexts the forecast loss versus security investment relationship may be referred to as a loss versus investment curve or as a risk versus investment (RVI) curve, for example when the application presents the relationship on a display screen in an x-y axis type of graphical plot. The loss versus investment curve may be employed by leaders, managers, or others to quantify the value to their organization of investment in threat countermeasures, investments in threat mitigations, investment in security products, investment in hiring and/or contracting security personnel, and/or investment in security actions and to justify such security investments to budget oversight authorities of the organization.

The application may identify a maximum forecast loss of the organization based on a valuation of the subject organization, for example based on a book value of a corporation and/or based on a total stock market capitalization of the corporation. Thus, intuitively, the maximum loss the organization may suffer is the loss of the total value of the organization. In another embodiment, however, the application may employ a different approach to appraising the maximum forecast loss, for example taking further notice of the liability of the corporation and/or of its insurers. The maximum forecast loss may be determined by a valuation of the assets that are deemed to be vulnerable to threats, thus the maximum forecast loss may be a fraction of the total value of the organization. The maximum forecast loss may be determined based on an estimate of the value of the organization made by a leader and/or manager or by averaging a plurality of estimates of the value of the organization made by a plurality of leaders and/or managers.

The application may modify the shape of the loss versus security investment curve in response to user inputs, for example user inputs identifying specific threat mitigation actions taken and/or threat countermeasures enacted and/or contemplated. The application may modify the shape of the loss versus security investment curve in response to changed scoring of current threats and/or changed ambient threat levels. Alternatively, the application may generate and present a family of loss versus security investment curves that represent loss versus investment based on different threat countermeasure initial conditions. The application may provide a user interface that promotes defining threat scores, threat countermeasures, and presenting the family of different loss versus security investment curves overlaid on the same x-y axis type graph on a display screen. This functionality of the application may promote a user comparing the pay back, the rates-of-returns, and/or results of different contemplated security investment programs, for example in a sandbox functionality provided by the application.

The application may provide input controls for a user to define a current level of organizational security investment to define a current operating point of the subject organization along the loss versus security investment curve. In an embodiment, the application may determine a local rate of return at the current operating point of the subject organization and present the local rate of return on the display. The application may determine and present a local rate of return on the display for each of a security investment in a threat countermeasure directed to general threats, a security investment in a threat countermeasure directed to sector specific threats, and a security investment in a threat countermeasure directed to targeted threats. The application may determine the local rate of returns and/or local rates of returns for each of a plurality of different loss versus security investment curves.

The application may analyze the vulnerability of the organization to threats in a general threat zone, threats in a sector specific threat zone, and threats in a targeted threat zone. In some contexts, the term threat category may be used substantially interchangeably with the term threat zone. Threats in the general threat zone may be identified as threats that are directed at all users of technology, for example a computer virus threat that may infect any desktop computer in any organization or a desktop computer in a private residence. Threats in the sector specific threat zone may be identified as threats that are directed to organizations that operate in the same industry sector, for example a campaign to steal personal identity information from any banking organization. Threats in the targeted threat zone may be identified as threats that are directed to a specific organization, for example an authentication malware threat that was developed to thwart the account security software of a specific credit card company. Malware may be software that has the purpose of promoting and/or supporting electronic crime, for example, software directed to defeating authorization software protecting access to confidential financial information.

The application may assign different weights or scores to the threats to which the organization is vulnerable. Determination of the threat scores may be based on whether the subject threat belongs to the general threat zone, the sector specific threat zone, and the targeted threat zone, and may reflect an evaluation of the loss potential of the organization in the subject threat zone. For example, the loss potential associated with a general threat may be evaluated at $10,000, while the loss associated with a targeted threat may be evaluated at $10,000,000. For example, a threat score of 4 may be assigned to a targeted threat and a threat score of 1 may be assigned to a general threat. Alternatively, a different threat score may be associated with each specific threat. In some cases, a threat score may be determined as the sum of a threat zone score and a threat specific score. In other cases, a threat score may be determined as the product of a threat zone score and a threat specific score. Likewise, a threat scale may be determined for each threat zone and/or for each individual threat. A threat scale may be defined as the maximum weight or score that a given threat and/or threat zone can have. Threat scores may not exceed a corresponding threat scale, but the threat score may be less than the threat scale, for example when the subject threat has been mitigated by some action, for example deployment of a countermeasure directed to the subject threat.

The application may evaluate a vulnerability of the subject organization to losses resulting from threats in each of the general threat zone, the sector specific threat zone, and the targeted threat zone based on the weights associated to the threat zones and based on the number of threats in each threat zone to which the subject organization is deemed to be vulnerable. The proportion of total vulnerability to losses and/or risk of the subject organization to threats in each of the threat zones may be presented as an overlay on the display along with the one or more loss versus expenditure curves. For example, in a hypothetical case, the vulnerability to losses and/or risk of an organization may be distributed as 10% to threats in the general threat zone, 25% to threats in the sector specific threat zone, and 65% to threats in the targeted threat zone, which may be presented on the display by a general threat bar whose width is about 10% of the total width of the graph, a sector specific threat bar whose width is about 25% of the total width of the graph, and a targeted threat bar whose width is about 65% of the total width of the graph. The display of each of the general threat bar, the sector specific threat bar, and the targeted threat bar may be presented in different colors and/or with a label to identify the threat zone. The proportion of the vulnerability to losses due to threats in each of the different threat zones may be determined based on the threat weights and/or the threat scores.

Turning now to FIG. 1, a system 100 for forecasting a security loss and for planning a threat countermeasures budget is described. In an embodiment, the system 100 may comprise a computer system 102, a risk analysis application 104, a network 106, a data store 108, a workstation 110, and a user interface 112. In other embodiments, however, the system 100 may take different forms. For example, in an embodiment, the system 100 may comprise a plurality of workstations 110 each providing the user interface 112, for example as a client application executing on the workstations 110. In an embodiment, the computer system 102 may provide the user interface 112. Alternatively, in an embodiment, the user interface 112 may be provided as a web based interface. In an embodiment, the risk analysis application 104 may be stored on and executed by the workstation 110 rather than by the computer system 102. One skilled in the art will appreciate that other variations of the system 100 are within the spirit and scope of the present disclosure.

Architectural and structural details of computer systems, such as computer system 102, are discussed further hereinafter. The workstation 110 may be implemented as a computer system. In an embodiment, the computer system 102 may be a more powerful computer, for example a computer with greater processing throughput capacity and/or greater memory capacity. In some contexts, the computer system 102 may be referred to as a server computer. In an embodiment, the workstation 110 may be a desktop computer, a laptop computer, a tablet computer, or a notebook computer having less processing throughput capacity and/or less memory capacity than the computer system 102. In an alternative embodiment, the risk analysis application 104 and the user interface 112 may be stored in a memory on the workstation 110 and executed by a processor of the workstation 110, obviating the need for the computer system 102.

In an embodiment, the workstation 110 communicates with the computer system 102 via the network 106. The network 106 may comprise a public communication network, a private communication network, or a combination of public and private communication networks. In an embodiment, the network 106 may comprise a variety of security features to authenticate and authorize access of the workstation 110 to the risk analysis application 104 and/or the data store 108. For example, the network 106 may comprise one or more firewalls that implement security policies limiting access to the risk analysis application 104, the computer system 102, and/or the data store 108. The network 106 may comprise one or more authentication, authorization, and accounting (AAA) servers that mediate the access of the workstation 110 to the computer system 102 and/or to the data store 108. In an embodiment, the communication link between the risk analysis application 104 and the user interface 112 is provided, at least in part, by a virtual private network (VPN) resource.

The risk analysis application 104 analyzes threats associated with an organization and presents information that promotes understanding those threats and the relationship between a financial loss vulnerability or risk of the organization as a consequence of those threats and a security spending and/or security investment of the organization. For example, the risk analysis application 104 may promote comparing different security investment strategies to determine which of a plurality of different security investment strategies is most effective in reducing the vulnerability of the organization to financial loss. In an embodiment, the risk analysis application 104 may comprise or invoke functionality of a third party spread sheet program.

A variety of organizations may advantageously use the system 100 and the risk analysis application 104 to understand their threats and their vulnerability to financial losses based on their security spending. These organizations may comprise publicly owned corporations, privately owned corporations, non-profit organizations, governmental organizations and/or departments, small businesses, religious organizations, and other organizations. These organizations may comprise hospitals, insurance companies, credit card companies, banks, corporations, government organizations such as military branches, universities, and/or other organizations that contemplate investing money to reduce exposure to financial losses due to threats.

The threats analyzed by the risk analysis application 104 may be assigned to a plurality of threat zones. In an embodiment, the threat zones may comprise a general threat zone, a sector specific threat zone, and a targeted threat zone. The general threat zone may comprise threats that are deemed to threaten any organization. Threats in the general threat zone may comprise infection of desktop computers with computer viruses, proliferation of transient rogue hosting services, increased geographic targeting of malware payloads, increased functional targeting of malware payloads, disposable distributed denial of service botnet infrastructure, increased reconnaissance campaigns, increased intrusion campaigns, data mining of customer information to support "black credit bureau" activity, increased contract intrusion against third party enterprise applications, subversion of outsourced software development marketplaces, and other threats. In some contexts a threat in the general threat zone may be referred to as a general threat.

Some of the threats associated with the general threat zone are described further below. Computer malware may be a computer program designed to perform negative and/or criminal actions. Proliferation of transient rogue hosting services may refer to the creation of an Internet infrastructure where electronic criminals may host websites used for criminal gain. Increased geographic targeting of malware payloads may refer to increased numbers of malware directed to conducting electronic crime in a specific geographic region.

Increased functional targeting of malware payloads may refer to increased numbers of malware directed to specific functional electronic crime. Disposable distributed denial of service botnet infrastructure may refer to a collection of malware, distributed across a plurality of computers (sometimes unknown to the owners of the subject computers, e.g., a computer virus), that can be remotely controlled to perform denial of service (DoS) attacks. Increased reconnaissance campaigns may refer to increased monitoring of general, sector specific, and/or targeted assets by electronic criminals for an increase in exposure to threats. Increased intrusion campaigns may refer to increased exploitation of exposures to infiltrate electronic assets. Data mining of customer information to support "black credit bureau" activity may refer to collecting personal identity information to support fraudulent use of the identity information. Increased contract intrusion against third party enterprise applications may refer to paying electronic criminal enterprises to gain access to an electronic infrastructure. Subversion of outsourced software development marketplaces may refer to paying a software developer to embed malware in otherwise legitimate outsourced software.

Threats in the sector specific threat zone may comprise threats that are deemed to threaten organizations operating in a specific sector. Threats in the sector specific threat zone may comprise systematic adversary testing of anti-fraud countermeasures thresholds, systematic adversary discussion of anti-fraud countermeasures thresholds, use of proxy botnet infrastructure to defeat anti-fraud countermeasures, increased threat of single issue distributed denial of service attack, expansion of regional electronic crime marketplace activities, expanded commercialization of regional electronic crime marketplace activities, and other threats. In some contexts, threats in the sector specific threat zone may be referred to as sector specific threats.

Some of the threats associated with the sector specific threat zone are described further below. Systematic adversary testing of anti-fraud countermeasures thresholds may refer to testing of anti-fraud countermeasures prior to deploying an electronic crime attack. Systematic adversary discussion of anti-fraud countermeasures thresholds may refer to discussion among electronic criminals of methods used to overcome sector specific countermeasures. Use of proxy botnet infrastructure to defeat anti-fraud countermeasures may refer to the use of centrally controlled botnets to defeat anti-fraud countermeasures. Increased threat of single issue distributed denial of service attack may refer to increased numbers of one-time-use denial of service attacks. Expansion of regional electronic crime marketplace activities may refer to creation of regional centers for processing criminally gained data. Expanded commercialization of regional electronic crime marketplace activities may refer to creation of regional centers for monetizing criminally gained data.

The targeted threat zone may comprise threats that are deemed to threaten an individual organization. Threats in the targeted threat zone may comprise affiliate schemes, financial laundering employing high-turnover mule networks, financial laundering employing multi-country hop mule networks, counterfeiting of luxury goods, software directed at circumventing account access authorization software, mass market malware, rise in data breaches, escrow fraud, increasing online petty crime, increased capabilities for distributed denial of service attacks for hire, click fraud, and other threats. In some contexts, threats in the targeted threat zone may be referred to as targeted threats.

Some of the threats associated with the targeted threat zone are described further below. Affiliate schemes may refer to fraudulently collecting sales commissions from a company outside of an affiliate agreement. Financial laundering employing high-turnover mule networks may refer to converting illegal gains to legitimate funds using a large group of unknowing intermediaries. Counterfeiting of luxury goods may refer to selling counterfeit luxury products purporting to be original for a fraction of the true market price for the original. Software directed to circumventing account access authorization software may refer to software specifically developed to bypass authentication software. Mass market malware may refer to malware simultaneously targeted toward specific companies. Escrow fraud may refer to purporting to be a trusted middle-man in a financial transaction. Click fraud may refer to altering the actual number of counted visits to a site in a pay-per-click marketing scheme.

In an embodiment, the threat zones may further comprise an indefensible threat zone. An indefensible threat may be a threat for which there is no cost-effective countermeasure available. An example of an indefensible threat may be a coup d'etat in a foreign country and a subsequent nationalization of foreign business holdings in the foreign country, including some of the field offices of the subject organization. In an embodiment, however, the indefensible threat zone may be ignored by the risk analysis application 104 on the premise that indefensible threats, by their nature, may not be responsive to security investments by the subject organization, but may be protected against by business continuity planning. In another embodiment, however, the indefensible threat zone may be analyzed by the risk analysis application 104 on the premise that, while not subject to mitigation by efforts of the subject organization to deploy countermeasures against the indefensible threats, including threats in the indefensible threat zone contributes to a more complete threat view and can be dynamic, for example changing as the world political situation and/or the world economic situation changes over time. In some contexts, threats in the indefensible threat zone may be referred to as indefensible threats.

It is understood that the threats identified above may apply to a variety of organizations. Other organizations, however, may not be vulnerable to these threats or may be vulnerable only to some of these threats. Other organizations may be vulnerable to different threats not identified above. Additionally, different organizations vulnerable to the same threat may have a different degree of vulnerability to the subject threat. While the threats above are identified as associated with only one threat zone, in practice some threats may be related to more than one threat zone and may be identified as associated with one threat zone based on a judgment about which threat zone the subject threat is most closely related to. Alternatively, certain threats may be designated as a threat to multiple zones and tracked separately for each zone according to the manner in which the threat is manifested.

In an embodiment, information defining the threats may be stored in the data store 108. The threat information may identify the threat zone, the threat scale, and the threat score of the subject threat. The threat scale may be a maximum score or maximum weight that the subject threat may have. The threat score is the score assigned to the subject threat based on a perceived vulnerability to the subject threat and a projected magnitude of the consequences should the threat be realized in fact. The threat score may be determined based on the threat zone to which the subject threat is deemed to belong, and threats associated with the same threat zone may be assigned the same threat score or threat weighting. Alternatively, at least some of the threats may be assigned a threat score associated with that specific threat, for example based on the perceived vulnerability to that specific threat. The threat score may be determined based on both a weighting associated with the subject threat zone and a threat specific weighting, for example a sum or a product of the two weightings.

In an embodiment, the threat information may be defined based on a standardized identification and scoring of threats. In some contexts, standardized identification and scoring of threats may be referred to as default threat information. In another embodiment, the threat information may be defined during an initial installation and/or configuration of the risk analysis application 104, for example by an end user of the risk analysis application 104 who is associated with the subject organization. The threat score may be based on threat countermeasures that are deployed and/or assumed to be deployed at the time of the analysis. This threat score may be referred to as a base threat score, an initial condition threat score, or as an unmitigated threat score. This threat score may be referred to as an unmitigated threat score in the sense of not having further threat countermeasures applied relative to an initial condition or initial state of the organization when the analysis was performed. A residual threat score may be defined as a threat score determined from the base threat score taking consideration of countermeasures directed to the subject threat that are not taken into consideration under the initial conditions of the analysis and also taking consideration ambient threat levels. Ambient threat levels are discussed further below. Base threat scores may be stored in the data store 108; residual threat scores may be determined by the risk analysis application 104 during the course of analyzing and presenting results on the user interface 112.

It is understood that the threat information defined for a first organization may be different from the threat information defined for a second organization. For example, different threats may be defined for the first organization from the threats defined for the second organization. Additionally, a threat that may be defined for both the first organization and the second organization may be associated with a first threat score by the first organization and may be associated with a second threat score by the second organization, where the first threat score and the second threat score are different values.

The threat information may be defined and/or updated by a consultant or employee of an independent threat mitigation services firm, for example to initialize the risk analysis application 104 and/or the data store 108. The threat information may be updated on a periodic basis and/or aperiodically in response to an event, for example a signal security breach at an organization similar to the subject organization. In some contexts, identification and scoring of threats that differs from the default threat information may be referred to as customized threat information and/or individualized threat information. In an embodiment, an initial analysis identifying the threats that beset an organization and determining an importance and/or the scoring of the threats may be conducted during installation of the risk analysis application 104.

The initial analysis may involve an analyst of the threat mitigation services firm interviewing appropriate personnel of the subject organization to ask them to identify and to score the threats that they perceive. The analyst may further suggest threats that are historically known to beset organizations like the subject organization. The initial analysis may include a process of averaging and/or collating the evaluations solicited from the interviewed personnel. The interviewed personnel may comprise managers responsible for organization security, information technology managers, a plurality of vice presidents, and others. The initial analysis may involve performing attack mapping, a process in which the structure and technology of the organization is systematically analyzed to identify specific exposures; identify mitigations and/or controls that can reduce and/or remove the exposure; and identify threats directed at overcoming these mitigations. The threat mapping can be effective in identifying threats and in determining threat scores.

Along with information about specific threats, the data store 108 may further store information about a global ambient threat level, a regional ambient threat level, and/or a local ambient threat level. The global ambient threat level may be a measure of the tendency of threats to be actualized as losses anywhere in the world. The global ambient threat level may increase or decrease, for example, in response to global economic conditions or changing global vulnerabilities. The information about the global ambient threat level may be stored in the data store 108 as a current global electronic crime index. The regional ambient threat level may be a measure of the tendency of threats to be actualized as losses in a specific region, for example in China or in Eastern Europe. The regional ambient threat level may increase or decrease, for example, in response to changes in governance in the subject region, for example a transfer of power from a stronger central authority to a weaker central authority. The information about the regional ambient threat level may be stored in the data store 108 as a current regional electronic crime index. Because an organization may have presence in multiple regions—for example a headquarters in the United States, a manufacturing facility in China, a marketing facility in Italy, and others—the regional ambient threat level may be determined as a weighted average among the regional ambient threat levels of the regions where the organization has presence. The weighting may be based on the value of the facilities in each of the regions, based on the importance of the facility to the organizational mission, and/or other factors. The local ambient threat level may be a measure of the tendency of threats to be actualized as losses in a specific location, for example in a specific city. The local ambient threat level may increase or decrease, for example, in response to a changing population of electronic criminals in the subject location. The information about the local ambient threat level may be stored in the data store 108 as a current local electronic crime index.

The global, regional, and/or local ambient threat level information may be updated periodically. Additionally, global, regional, and/or local ambient threat levels may be updated aperiodically in response to events. Issues that may change ambient threat levels may comprise trade disputes, invasions, boundary disputes, disputed elections, public statements of government leaders, public statements of financial leaders, changing rigor of enforcement of laws, and other. Events that may cause the ambient threat levels to increase comprise an increased value for electronic account credentials associated with the subject corporation in an electronic crime marketplace, an appearance of new malware that targets electronic account credentials secured by software similar to that used by the subject organization to protect and authorize access to its electronic accounts, and other like events.

The risk analysis application 104 analyzes the threats associated with the organization based on the threat information, including the threat score and threat zone information associated with the threats, and based on the ambient threat levels in the data store 108, for example based on the current global electronic crime index, the current regional electronic crime index, and the current local electronic crime index. The risk analysis application 104 determines a relationship between a forecast loss and the security investment of the organization, for example a functional relationship mapping the security spending of the organization to the forecast loss, based at least in part on analyzing the threat information. In some contexts, the functional relationship mapping the security investment of the organization to the forecast loss also may be referred to as a systemic loss versus security investment relationship. The risk analysis application 104 may determine the functional mapping between security spending and forecast loss using mathematical operations to fit analysis results to a pre-defined type of function. In an embodiment, the risk analysis application 104 may determine the functional mapping between security spending and forecast loss to fit the analysis results to a decaying exponential function or to some other curve function, where the function maps a zero security investment to a maximum forecast loss of the organization. In general, it is an insight of the present disclosure that increasing security investments and/or security spending generally decreases forecast systemic losses by the organization and that increasing security investments and/or security spending leads to decreasing rates of returns on an incremental security investment.

The risk analysis application 104 may determine the functional mapping between security investment and forecast loss without considering any further investment in threat countermeasures, for example based on a set of initial conditions of deployed and/or assumed to be deployed threat countermeasures, to generate and present a first curve. The first curve may be referred to as a base curve and/or an initial condition curve. The first curve may change over time as the ambient threat levels change and/or as the base threat scores are adjusted. The risk analysis application 104 may adjust the functional mapping, for example modulating coefficients of a general mathematical formula, to determine another functional mapping between security spending and forecast loss based on specified security investments in specific threat countermeasures and based on changes in the ambient threat levels. In an embodiment, the risk analysis application 104 may determine the residual threat score as a difference between the base threat score and a corresponding countermeasures score. The risk analysis application 104 may modulate the coefficients and/or constants of the general mathematical formula based on the residual threats to determine a second loss versus security investment curve.

The risk analysis application 104 may implement the functional relationship mapping using a data table defining specific points of the relationship and interpolating between these specific points. The risk analysis application 104 may interpolate between specific points defined in the data table using a linear interpolation, using a quadratic interpolation, using a cubic interpolation, a higher order polynomial interpretation (e.g., higher than third order), or using other known interpolation methods. Alternatively, the risk analysis application 104 may implement the functional relationship by synthesizing a mathematical function that approximates the derived function intersecting one or more known data points, for example the maximum forecast loss point. The risk analysis application 104 may rely in part on a third party spreadsheet program to analyze threat scores, threat countermeasures undertaken, and known data points to determine the curve.

The maximum forecast loss may be determined in a variety of ways. The maximum forecast loss may be related to and/or based on an estimated total value of the organization. In an embodiment, the total value of the organization may be estimated based on a total market capitalization of the subject organization, for example a corporation whose stock is traded on a public stock market. In an embodiment, the total value of the organization may be estimated based on a book value of the subject organization. In an embodiment, the total value of the organization may be estimated based on an accounting analysis of the assets of the subject organization. In an embodiment, the total value of the organization may be estimated based on an opinion and/or based on averaging a plurality of opinions as to the total value of the subject organization. In an embodiment, the maximum forecast loss may be determined as a fraction of the estimated total value of the organization, for example as one fourth of the estimated total value, as one third of the estimated total value, as one half of the estimated total value, or as some other fraction of the estimated total value. The fraction may be determined as the fraction of total assets of the organization that are deemed to be exposed and/or at risk to threats.

Other points of the forecast loss versus security investment relationship and/or function may be identified based on other information, for example historical information related to past losses due to actualized threats experienced by the organization and historical information on security investment at about the time of the past losses. Security investment includes spending and/or investment on threat countermeasures, on facility physical security including badge readers controlling automated door locks, computer security personnel, security personnel, anti-virus software packages, authorization software protecting electronic access to financial information and/or accounts, and the like. Other points of the forecast loss versus security investment relationship may be identified based on an opinion or an average of a plurality of opinions. For example, a point that may correspond to the right-most boundary of the curve may be defined as the ordered pair (maximum effective investment, minimum realistic loss). Other points of the forecast loss versus security investment relationship may be identified based on data obtained from other organizations, for example organizations collaboratively sharing limited information to promote mutual security. Alternatively, other points of the forecast loss versus security investment relationship may be identified based on proprietary data obtained from a risk mitigation services firm.

The risk analysis application 104 may fit the analysis results to the pre-defined type of function further based on the maximum forecast loss of the organization as well as based on the other points determined as described above. In an embodiment, the function may be defined to achieve a best fit to the data points using any of a variety of curve fitting algorithms, for example, using the Levenberg-Marquardt minimization technique.

The curve and/or function may be generated to fit two or more known data points of the systemic loss versus security investment relationship based on a presumed curve type and/or presumed function type. In an embodiment, the presumed curve type may be an exponential decay and the forecast loss versus security investment function may take the general mathematical form $$Me^{kI}+R=\text{SystematicLoss} \qquad \text{(Equation 1)}$$

where M is a constant equal to the maximum forecast loss, e is the base of the natural logarithm, k is an exponential decay constant selected to fit one or more known data points, I is the security investment, and R is an offset constant. In some circumstances, the value of R may be zero. While the base of the natural logarithm, an irrational number e having a value of approximately 2.718281828, has been used in Equation 1 above, one skilled in the art will readily appreciate that other exponential bases also may be selected to generate an exponential decay curve, for example the number 10 or some other number.

In combination with the present disclosure, one skilled in the art will readily determine the exponential decay constant k based on one or more historical data points, where each data point is defined by a known security investment paired with a known systemic loss. In an embodiment, the decay constant k may be determined as $$k = k'\left(1 - \frac{RT}{TS}\right) \quad \text{(Equation 2)}$$

where RT is a variable having a positive value equal to the sum of the residual threats, TS is a constant having a positive value equal to the sum of the threat scales, and k' is a constant selected to make Equation 1 fit one or more known data points. Because by definition RT≦TS, the term within the parentheses in Equation 2 is always positive. Other values of k and other methods of determining the value of k are also contemplated by the present disclosure.

It is understood that the base curve, the initial condition curve, may be determined from Equation 1 and Equation 2 by using the sum of base threat scores in the place of RT. Of course, under initial conditions, i.e., with no further deployment of threat countermeasures beyond what are taken as initial condition threat countermeasures, the base threat scores are equal to the residual threat scores by definition. Curves taking account of proposed additional threat countermeasures may be determined from Equation 1 and Equation 2 by using the appropriate value of residual threat scores in the variable RT. As deployment of further threat countermeasures are included in the analysis by the risk analysis application 104, the residual threat scores decrease, the value of RT decreases, the decay constant k grows larger, and hence the subject exponential curve decays more rapidly. The result implied by this mathematical description is that deployment (or modeled deployment) of additional threat countermeasures cause the forecast losses to be less at a given security investment operating point. Because different threat countermeasures may have more or less impact on residual threat scores, different threat countermeasures may deliver more or less reduction in forecast losses at the given security investment operating point.

The technique described above with reference to an exponential decay curve can be applied likewise to other presumed curve types to define the forecast loss versus security investment function. In an embodiment, a linear equation may be determined using a best fit method based on the maximum forecast loss of the organization as well as other points determined as described above, and this linear equation may be used to generate the curve of the forecast loss versus security investment relationship. A linear equation representing the forecast loss versus security investment function may take the general mathematical form $$aI+b=\text{SystematicLoss} \quad \text{(Equation 3)}$$

where b is a constant equal to the maximum forecast loss, a is a constant having a negative value determined using the best fit method, and I is the security investment. The domain of independent variable I in Equation 3 may be constrained to a value from 0 to a positive number equal to $bI(-a)$. In an embodiment, an n-th order polynomial equation may be determined using a best fit method based on the maximum forecast loss of the organization as well as other points determined as described above, and this polynomial equation may be used to generate the curve of the forecast loss versus security investment relationship. A polynomial equation of n-th order representing the forecast loss versus security investment function may take the general mathematical form $$a_0+a_1I+a_2I^2+\ldots+a_nI^n=\text{SystematicLoss} \quad \text{(Equation 4)}$$

where $a_i$ are constants determined using a best fit method based on the maximum forecast loss of the organization as well as other points determined as described above and I is the security investment. The domain of the independent variable I in Equation 4 may be constrained to a value from zero to a positive number. One skilled in the art will readily appreciate that Equation 3 is a special case of Equation 4: the linear equation of Equation 3 is simply a first order polynomial equation.

In an embodiment, the presumed curve type associated with the forecast loss versus security investment function may be a transcendental function, for example a sine function. A sine function representing the forecast loss versus security investment function may take the general mathematical form $$a\sin(b+I)+c=\text{SystematicLoss} \quad \text{(Equation 5)}$$

where a, b, and c are constants determined using a best fit method based on the maximum forecast loss of the organization as well as other data points determined as described above and I is the security investment. The domain of the independent variable I may be constrained to a suitable range of values. Yet other functions may be used as the presumed curve type to define the forecast loss versus security investment relationship and fitted to the maximum forecast loss of the organization and other data points determined as described above. The form of equation chosen to generate the curve of the forecast loss versus security investment relationship, the presumed curve type, may be selected by one skilled in the art, in combination with the present disclosure, to achieve a suitable balance between accurate tracking of historical data and ease and/or speed of calculation.

Figure 2:
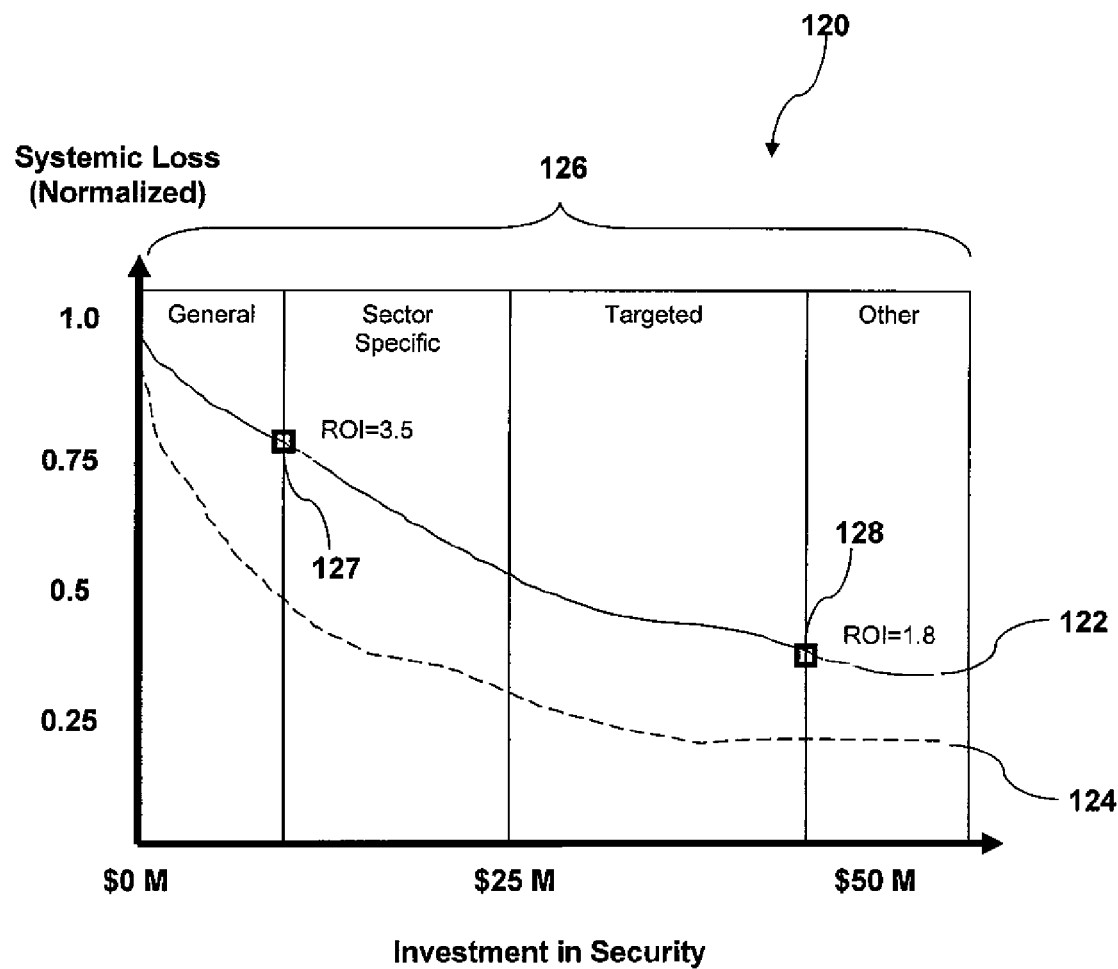
FIG. 2 is an illustration of an exemplary display of a forecast loss versus expenditure curve according to an embodiment of the disclosure.

Turning now to FIG. 2, a display 120 of a forecast loss versus security investment relationship is discussed. The display 120, which may be presented by the user interface 112, includes a first forecast loss versus security investment curve 122 and a second forecast loss versus security investment curve 124. The first curve 122 may be referred to as the base curve and the second curve 124 may be referred to as a residual threat curve. While two curves are shown in FIG. 2, it is understood that the display 120 may show a single curve or more than two curves, as will be discussed in more detail hereinafter. The independent variable of the functional relationship depicted by the curves 122, 124 is the investment in security or security expenditure. The dependent variable of the functional relationship depicted by the curves 122, 124 is the forecast loss or systemic loss over a time interval, for example a quarter of a year, a year, or some other time interval. In an embodiment, the risk analysis application 104 controls the presentation of the display 120.

While the display 120 shown in FIG. 2 shows the range of the security investment variable extending from 0 dollars to 50 million dollars, it is understood that the security investment variable may have a different range and/or may be represented using different currency units. For example, the range of the security investment may begin at 20 million dollars and extend to 100 million dollars. As another example, the range of the security investment may begin at 10 million Euros and extend to 80 million Euros.

While the display 120 shown in FIG. 2 shows the domain of the systemic loss variable extending from 0 to 1.0, where the maximum systemic loss is normalized to unity, in another case the maximum systemic loss may be identified in a currency unit that corresponds to the maximum forecast loss described further above. For example, the maximum systemic loss may be identified as 1 billion dollars or as 200 million Euros. In an embodiment, the risk analysis application 104 may be configurable to command the display 120 to display the maximum systemic loss in a variety of formats such as normalized to 1.0, as a maximum forecast loss represented in dollar currency units, as a maximum forecast loss represented in Euro currency units, as a maximum forecast loss represented in renminbi currency units, as a maximum forecast loss represented in rupee currency units, and/or as a maximum forecast loss represented in some other currency units. In an embodiment, the display 120 and/or the user interface 112 provides input controls for a user to select a preferred format for presenting the systemic loss.

The display 120 may further comprise a plurality of threat zone bars 126. The threat zone bars 126 may comprise a bar associated with the general threat zone, a bar associated with the sector specific threat zone, a bar associated with the targeted threat zone, and a bar associated with the indefensible threat zone. In another embodiment, different threat zones may be represented. For example, the threat zone bars 126 may not include a bar associated with the indefensible threat zone. The relative width and/or the relative magnitude of each of the threat zone bars 126 represents the relative weight of the subject threat zone in the aggregate threat environment in which the subject organization operates. For example, in an exemplary threat environment, the bar associated with the general threat zone may comprise about 15% of the threat zone bars 126, the bar associated with the sector specific threat zone may comprise about 30% of the threat zone bars 126, the bar associated with the targeted threat zone may comprise about 45% of the threat zone bars 126, and the bar associated with the indefensible threat zone may comprise about 10% of the threat zone bars 126. The relative widths of the threat zone bars 126 may be determined based on a ratio of the sum of the threat scores in a threat zone to the sum of threat scores across all threat categories.

The risk analysis application 104 may determine the relative weights of the threat zones based on an analysis of the threat environment in which the subject organization operates, for example based on the threat information stored in the data store 108. It is understood that there is no direct relationship between the presentation of the threat zone bars 126 and the presentation of the curves 122, 124. The presentation of the threat zone bars 126 overlaid with the presentation of the curves 122, 124 may provide the advantage of conveying more information at a glance to a busy manager. In another embodiment, however, rather than overlaying the presentation of the threat zone bars 126 with the presentation of the curves 122, 124, the threat zone bars 126 may be presented in a separate display (not shown) independently of the presentation of the curves 122, 124.

A variety of threat mitigation actions and/or threat countermeasures may be undertaken to reduce the vulnerability of the organization to threats, which is captured by residual threat scores. For example, a variety of threat countermeasures may be deployed to reduce the vulnerability of the organization to one or more specific threats. Some threat countermeasures may be directed to reducing the vulnerability of the organization to a threat associated with one threat zone, for example to a threat associated with the sector specific threat zone. Other threat countermeasures may be directed to reducing two or more threats in one threat zone. Other threat countermeasures may be directed to reducing the vulnerability of the organization to threats belonging to a plurality of different threat zones. The user interface 112 may provide a screen or other input mechanism for identifying prospective threat countermeasures (prospective meaning in addition to initial condition countermeasures understood to be in effect and already taken into consideration by the base threat scores). For further information about mitigating threats see U.S. patent application Ser. No. 12/132,327, filed Jun. 3, 2008, entitled "Electronic Crime Detection and Tracking," by John P. Watters et al., which is incorporated by reference herein.

The risk analysis application 104 may define the first forecast loss versus security investment curve 122 based on an analysis of the base threat scores independently of any further threat countermeasures. The risk analysis application 104 may define the second forecast loss versus security investment curve 124 based on an analysis of the threats to which the organization is vulnerable and further based on one or more threat countermeasures that are either deployed or simulated, for example based on the sum of residual threat scores. Generally, the effect of deploying a countermeasure on the forecast loss versus security investment relationship is that the shape of the curve drops or sags. In some contexts, the second forecast loss versus security investment curve 124 may be referred to as a forecast residual loss versus security investment function curve.

In an embodiment, the residual threat score may be determined by subtracting a countermeasures score from the base threat score. The residual threat scores may feed into the curve generation performed by the risk analysis application 104 by changing constants and/or coefficients in the curve equation. The residual threat score may be considered to map to a residual loss and/or residual systemic loss. For example, as the value of RT decreases in Equation 2 above, the value of the decay constant k gets larger, which causes the systemic loss versus security investment curve generated by Equation 1 to decay more rapidly, perturbing the second forecast loss versus security investment curve 124 downwards and/or to the left. When the curves 122, 124 are based on a different curve type, for example an n-th order polynomial curve type or a sine curve type, the residual threat weight value may be used to modify the constants of the associated general equation types to derive the second forecast loss versus security investment curve 124 and/or additional forecast loss versus security investment curves.

In some contexts, the second forecast loss versus security investment curve 124 and/or other additional forecast loss versus security investment curves may be said to be derived curves and/or may be said to be derived from the first forecast loss versus security investment curve 122. For example, the curve may be shifted upwards by the addition of a constant value to account for an increased perceived general threat level. While two curves 122, 124 are shown in FIG. 2, it is contemplated that the risk analysis application 104 supports displaying any number of forecast loss versus security investment curves associated with the selection or one or more different threat countermeasures for deployment or simulation. A plurality of forecast loss versus security investment curves may be referred to as a family of curves.

The risk analysis application 104 may analyze the one or more forecast loss versus security investment curves at one or more points on the curve to determine a return on investment (ROI) and/or a rate-of-return at the subject point on the curve. For example the user interface 112 may provide a control for designating a point on one of the curves 122, 124 at which the return on investment is to be determined. When a point is designated on the curve, the risk analysis application 104 may determine the return on investment at that designated point and present the value of the return on investment in the display 120. In FIG. 2, a first selection box 127 is shown designating a first point on the curve and a second selection box 128 is shown designating a second point on the curve. For example, the return on investment at the first point on a curve may be determined to be 3.5, meaning that a dollar invested in security measures may reduce forecast losses by about 3.5 dollars. As another example, the return on investment at the second point on the curve may be determined to be 1.8, meaning that a dollar invested in security measures may reduce forecast losses by about 1.8 dollars.

In an embodiment, the risk analysis application 104 may determine a rate-of-return for incremental investments in a countermeasure directed to general threats, a rate-of-return for incremental investments in a countermeasure directed to sector specific threats, and a rate-of-return for an incremental investment in a countermeasure directed to targeted threats. The user interface 112 may promote a user selecting a point on the forecast loss versus security investment curve at which to determine a general countermeasure rate-of-return and/or a general countermeasure return on investment. The user interface 112 then may display a numerical quantification of the general countermeasure rate-of-return proximate to the designated point on the forecast loss versus security investment curve. The user interface 112 likewise may promote the user selecting a point on the forecast loss versus security investment curve at which to determine a sector specific countermeasure rate-of-return and/or a sector specific countermeasure return on investment. The user interface 112 then may display a numerical quantification of the sector specific countermeasure rate-of-return proximate to the designated point on the forecast loss versus security investment curve. The user interface 112 similarly may promote the user selecting a point on the forecast loss versus security investment curve at which to determine a targeted countermeasure rate-of-return and/or a targeted countermeasure return on investment. The user interface 112 then may display a numerical quantification of the targeted countermeasure rate-of-return proximate to the designated point on the forecast loss versus security investment curve. In an embodiment, the user interface 112 may promote selecting a point on the forecast loss versus security investment curve—for example on the curves 122, 124—at which to calculate the rate-of-return for security investments (investments not allocated to a specific countermeasure), the general countermeasure rate-of-return, the sector specific countermeasure rate-of-return, and the targeted countermeasure rate-of-return and may display each of these rates-of-return proximate to the designated point on the forecast loss versus security investment curve. This may promote a user more readily understanding the trade offs between different security investment alternatives and/or between different security investment strategies.

In an embodiment, a user of the risk analysis application 104 may perform a variety of operations in a trial and error process to determine how best to apply a limited security budget. A second display, similar to the display 120, may present a sandbox view of the forecast loss versus security investment curves. For example, the risk analysis application 104 may be employed to determine whether forecast losses are reduced more by a $100,000 investment to deploy one or more threat countermeasures, which would be represented by a different forecast loss versus security investment curve, or by investing the same $100,000 in generalized security expenditures, for example hiring an additional information technology security engineer, both of which would involve moving an equal distance along the curve to the right.

The generalized security investment may tend to reduce the forecast loss of the organization and generally mitigate a plurality of threats, as indicated by moving to the right along the forecast loss versus security investment curve. Such generalized security investments may include hiring additional security personnel, upgrading computer virus detection software, hiring additional information technology security engineers, budgeting an information technology security development and/or maintenance project, and the like. The threat countermeasures, unlike generalized security investments, are directed specifically at one or more threats and not only cause the operating point of the organization to move to the right along the forecast loss versus security investment curve but additionally modify the shape of the forecast loss versus security investment curve. The results of using the risk analysis application 104 to quantify and understand the results of different investments in security measures and investing in different threat countermeasures may be used to provide rationale for security budgets.

Turning now to FIG. 3, a threat scoring table 150 is described. In an embodiment, the risk analysis application 104 may present the threat scoring table 150 as an input screen to promote defining threats and/or threat scores. The threat scores contained in the threat scoring table 150 are base threat scores based on perceived magnitude of threats in the context of initial condition threat mitigations. The threat scoring table 150 may define a score, weight, or a value for each of the threats identified as described above. The threat scores may be organized according to the threat zones described above: a general threat zone 152, a sector specific threat zone 154, a targeted threat zone 156, and an indefensible threat zone 158. Each threat may be assigned a score for each of a general phase 160, a credentials collection phase 162, a monetization phase 164, and a laundering phase 166, where the phases 160, 162, 164, and 166 relate to an electronic crime business process and/or electronic crime lifecycle. The electronic crime lifecycle may comprise a plurality of phases including a credential collection phase, a monetization phase, and a laundering phase. The general phase may refer to electronic crime activities that are not localized to one of these three phases or which occur across all three phases. For more details about the electronic crime lifecycle and/or the electronic crime business process, see U.S. patent application Ser. No. 12/132,327, filed Jun. 3, 2008, entitled "Electronic Crime Detection and Tracking," by John P. Watters et al., which was incorporated by reference above.

The scores of a subject threat may be summed in a total column 167. Each of the phase scores of the threats within the general threat zone 152 may be summed in a first threat sub total row 168. Note that when a threat has non-zero scores in a plurality of threat zone columns, this implies that the subject threat impacts the organization in more than one threat zone. Each of the phase scores of the threats within the sector specific threat zone may be summed in a second threat sub total row 170. Each of the phase scores of the threats within the targeted threat zone 156 may be summed in a third threat sub total row 172. Each of the phase scores of the threats within the indefensible threat zone 158 may be summed in a fourth threat sub total row 174. Each of the threat sub total rows 168, 170, 172, and 174 may be summed in a threat grand total row 176.

The threat scores in the threat scoring table 150 may be configured during installation of the risk analysis application 104 as described above and may be updated periodically and/or aperiodically as events occur. As the electronic crime indices described above increase or decrease in value, the threat scores may be increased or decreased automatically under control of the risk analysis application 104. The threat scores in the threat scoring table 150 may be employed by the risk analysis application 104 to determine the equation defining the first forecast loss versus security investment curve 122, for example to define one or more constants. In some contexts, the threat scoring table 150 may be referred to as describing the unmitigated threat environment and/or threatscape.

Turning now to FIG. 4, a countermeasures scoring table 200 is described. In an embodiment, the risk analysis application 104 may present the countermeasures scoring table 200 as an input screen to promote defining threat countermeasures either deployed or contemplated. For example, in a sandbox operation mode or in a sandbox screen provided by the risk analysis application 104, a user may enter countermeasures scores in a trial-and-error process to determine preferred security investment distributions. The countermeasures scoring table 200 may define a score, weight, or value for threat countermeasures applied against the threats identified in the threat scoring table 150. The threat countermeasure scores may be organized according to the threat zones described above: a general threat zone 202, a sector specific threat zone 204, a targeted threat zone 206, and an indefensible threat zone 208. Each countermeasure applied to a specific threat may be assigned a countermeasure score for each of a general phase 210, a credentials collection phase 212, a monetization phase 214, and a laundering phase 216, where the phases 210, 212, 214, and 216 relate to the electronic crime lifecycle. The countermeasures scores of each countermeasure applied to a threat may be summed in a countermeasure score total column 218. Each of the phase scores of the countermeasures may be summed in a first countermeasures sub total row 224, a second countermeasures sub total row 226, a third countermeasures sub total row 228, and a fourth countermeasures sub total row 230, similarly to the summing of threat scores to threat sub total rows 168, 170, 172, and 174 described above. Each of the countermeasures sub total rows 224, 226, 228, 230 may be summed in a countermeasures grand total row 232.

The countermeasures scoring table 200 may further define an arithmetic column 220 and an actual column 222. The arithmetic column represents the difference between a threat score total 169 from the threats scoring table 150 and a corresponding countermeasures total column 218 from the countermeasures scoring table 200. The actual column 222 comprises values from the arithmetic column 220 limited to non-zero numbers. Thus, when a value in the arithmetic column 220 is a negative number, the corresponding value in the actual column 222 is zero. The values in the actual column 222 in the countermeasures sub total rows 224, 226, 228, and 230 correspond to residual threat zone threat scores. The value in the actual column 222 in the countermeasures grand totals row 232 corresponds to the residual threat zone total threat scores. The residual threat scores may be employed to determine the constants used to generate the second forecast loss versus security investment curve 124 and/or additional forecast loss versus security investment curves.

The countermeasures may comprise a variety of different tools and/or actions that promote reducing vulnerability to threats. A first countermeasure comprises a periodic threat update report that notifies of existing security vulnerabilities, malware that is known to be in circulation that exploit the subject security vulnerabilities, available computer software patches which may be directed to countering the known malware, and other general electronic crime monitoring information. The threat update report may be considered to address threats in the general threat zone. In the countermeasures scoring table 200 represented in FIG. 4, the first countermeasure is indicated by IS, which stands for INTELLISIGHT, a security product available from iSIGHT Partners Corporation. A second countermeasure provides a monthly summary report of security issues. In the countermeasures scoring table 200 represented in FIG. 4, the second countermeasure is indicated by MTR, which stands for MONTHLY THREAT REPORT, a security product available from iSIGHT Partners Corporation A third countermeasure comprises analysis provided by a threat mitigation services firm provides knowledge and insight into collection, monetization, and laundering techniques of the electronic crime lifecycle and how it relates to the subject organization. A first level of this service is directed to sector specific risks that threaten the subject organization. In the countermeasures scoring table 200 represented in FIG. 4, this countermeasure is indicated by TSB, which stands for THREATSCAPE BASIC, a security service available from iSIGHT Partners Corporation. A second level of this service is directed to targeted risks that threaten the subject organization. In the countermeasures scoring table 200 represented in FIG. 4, this countermeasure is indicated by TSP, which stands for THREATSCAPE PREMIUM, a security service available from iSIGHT Partners Corporation. A fourth countermeasure comprises an electronic crime command and coordination Center as described more fully in U.S. patent application Ser. No. 12/132,327, filed Jun. 3, 2008, entitled "Electronic Crime Detection and Tracking," by John P. Watters et al., which was incorporated by reference above. In the countermeasures scoring table 200 represented in FIG. 4, the fourth countermeasure is indicated by EC4, a security service available from iSIGHT Partners Corporation. A fifth countermeasure comprises a service for performing risk assessment and mapping threat data. The fifth countermeasure is available as the IRAM product from iSIGHT Partners Corporation.

Figure 5:
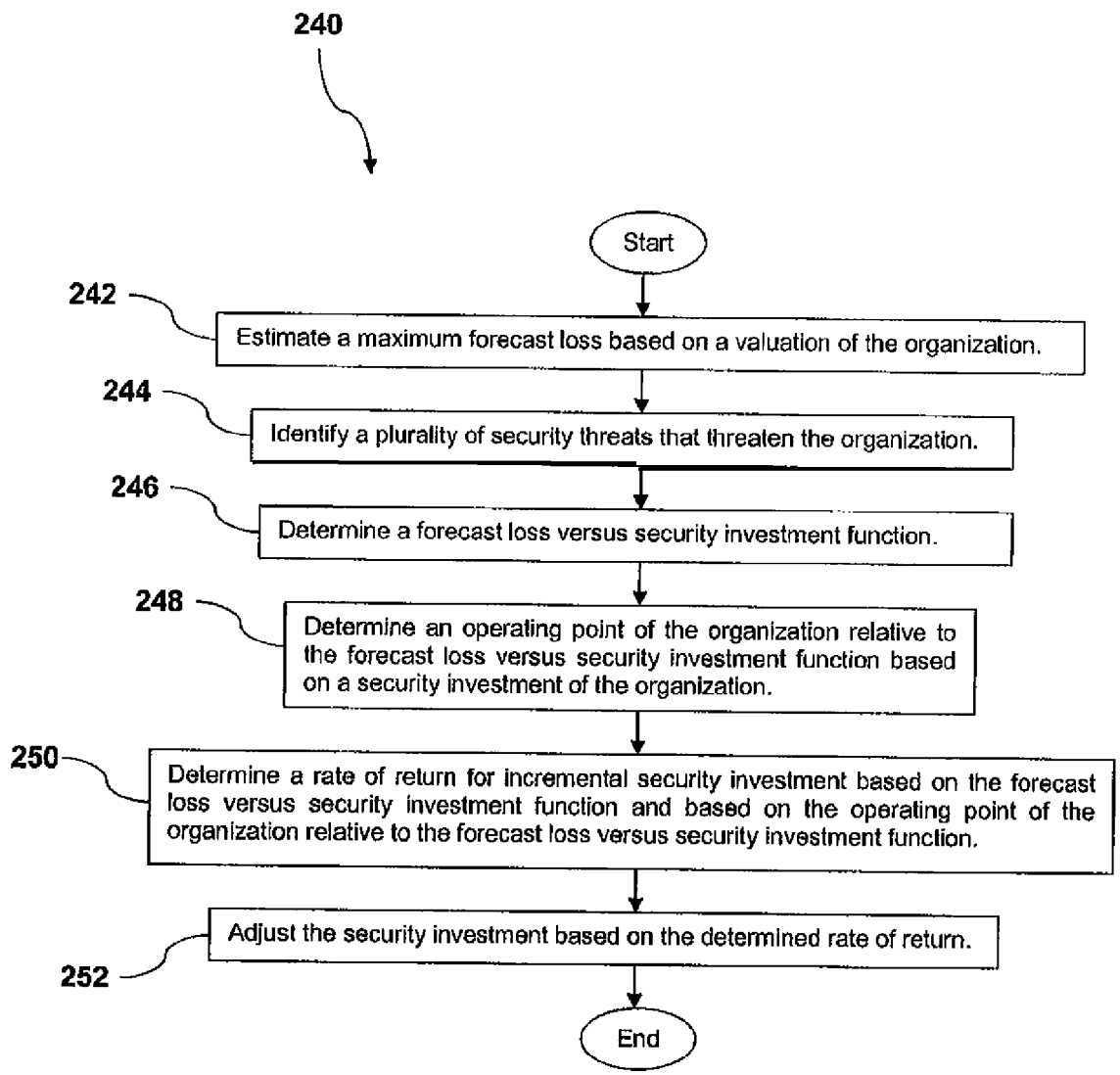
FIG. 5 is an illustration of a method of budgeting security investments according to an embodiment of the disclosure.

Turning now to FIG. 5, a method 240 is described. At block 242, a maximum forecast loss is estimated based on a valuation of the organization. The valuation of the organization and/or the maximum forecast loss may be determined as discussed further above. At block 244, a plurality of threats are identified that the organization is vulnerable to. This information may be configured into the data store 108 or into the risk analysis application 104. At block 246, a forecast loss versus security investment function is determined. In an embodiment, the processing of block 246 may be performed by the computer system 102. For example, the forecast loss versus security investment function may be determined by the risk analysis application 104 as described further above. A definition of the forecast loss versus security investment function may be stored as an equation in the data store 108. In an embodiment, determining the forecast loss versus security investment function may involve storing and/or modifying coefficients of a general equation in the data store 108.

At block 248, an operating point of the organization relative to the forecast loss versus security investment function is determined based on a security investment of the organization, for example a current security investment and/or an initial condition security investment. In an embodiment, the operating point of the organization relative to the first forecast loss versus security investment curve 122 may be designated by the first selection box 127. In an embodiment, the processing of block 248 may be performed by the computer system 102. At block 250, a rate of return is determined for incremental security investment based on the forecast loss versus security investment function and based on the operating point of the organization relative to the forecast loss versus security investment function. In an embodiment, the processing of block 250 may be performed by the computer system 102. At block 252, the security investment of the organization is adjusted based on the determined rate of return. In an embodiment, the processing of blocks 246, 248, and 250 may be performed, at least in part, by the workstation 110 rather than by the computer system 102.

In the absence of substantial security losses suffered by the organization, it may be difficult to justify a substantial investment by the organization in threat countermeasures and/or in security investments. On the other hand, it is a costly practice to wait until a substantial security loss occurs to perceive the value of investments in threat countermeasures and/or security investments. Even if management has bought into the importance of investment in threat countermeasures and/or security investments, the question remains how much investment in threat countermeasures and/or security investments is appropriate? The information determined by the method 240 and by the system 100 may be employed to plan an annual or quarterly security budget. The information may promote an executive or manager responsible for security providing quantitative justification for a security budget.

It is understood that the method 240 may be extended in a variety of ways. For example, the security investment may be adjusted based further on inputting a hypothetical threat countermeasure, which may involve the determination of a second forecast loss versus security investment function or curve, for example the second forecast loss versus security investment curve 124, as discussed further above, and choosing to spend some of the security budget on the hypothetical threat countermeasure. Because in an embodiment at least some of the method 240 may be performed by a computer, in some contexts the method 240 may be referred to as a computer implemented method and/or an automated method. This does not preclude that some of the actions described with reference to the method 240 may be performed manually, as by a human being selecting from options and/or entering data into the user interface 112 of the workstation 110 or as by other manual actions.

Figure 6:
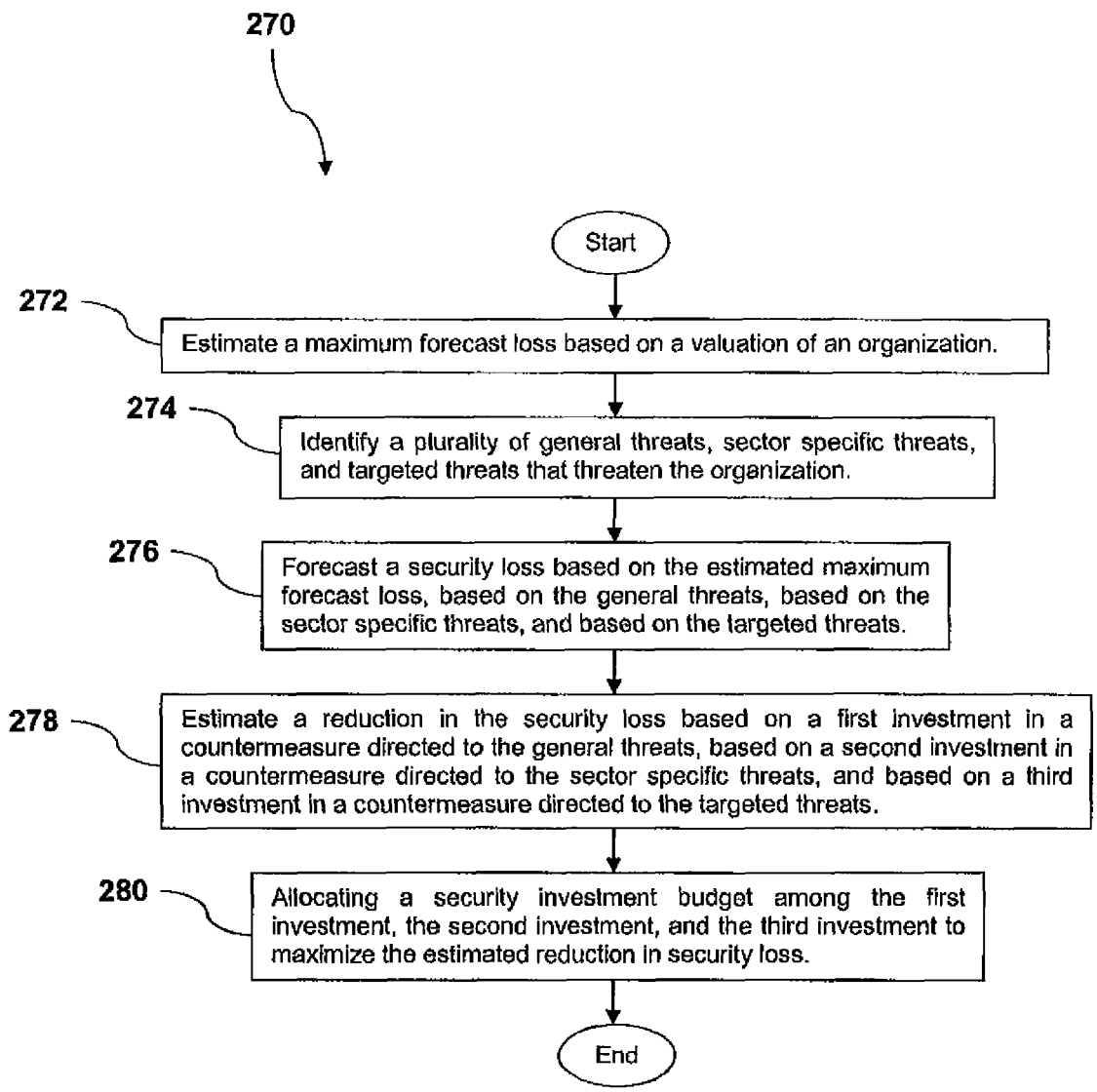
FIG. 6 is an illustration of a method of planning security actions according to an embodiment of the disclosure.

Turning now to FIG. 6, a method 270 is described. In an embodiment, the method 270 may be automated or portions of the method 270 may be automated. At block 272, a maximum forecast loss is estimated based on a valuation of the organization. The valuation may be performed as described further above. At block 274, a plurality of general threats, sector specific threats, and targeted threats are identified. At block 276, a security loss is forecast based on the estimated maximum forecast loss, based on the general threats, based on the sector specific threats, and based on the targeted threats. In an embodiment, the processing of block 276 may comprise analyzing the distribution of the general threats, the sector specific threats, and the targeted threats across an electronic crime business process and/or electronic crime lifecycle. The electronic crime lifecycle may comprise a plurality of phases including a credential collection phase, a monetization phase, and a laundering phase. For more details about the electronic crime lifecycle and/or the electronic crime business process, see U.S. patent application Ser. No. 12/132,327, filed Jun. 3, 2008, entitled "Electronic Crime Detection and Tracking," by John P. Watters et al., which was incorporated by reference above. The processing of block 276 may be performed by the computer system 102.

At block 278, a reduction in the forecast security loss is estimated based on a first investment in one or more countermeasures directed to general threats, based on a second investment in one more countermeasures directed to sector specific threats, and based on a third investment in one or more countermeasures directed to targeted threats. In an embodiment, the processing of block 278 may be performed by the computer system 102. At block 280, at least a portion of a security investment budget is allocated among the first investment, the second investment, and the third investment to optimize the estimated reduction in forecast loss. In some contexts, optimizing the estimated reduction in forecast loss may be referred to as maximizing the estimated reduction in security loss. In an embodiment, the processing of block 280 may be performed by the computer system 102. As discussed further above, some or all of the processing in blocks 276, 278, and 280 that is described as being performed by the computer system 102 may be performed on the workstation 110. Because in an embodiment at least some of the method 270 may be performed by a computer, in some contexts the method 270 may be referred to as a computer implemented method and/or an automated method. This does not preclude that some of the actions described with reference to the method 270 may be performed manually, as by a human being selecting from options and/or entering data into the user interface 112 of the workstation 110 or as by other manual actions.

Figure 7:
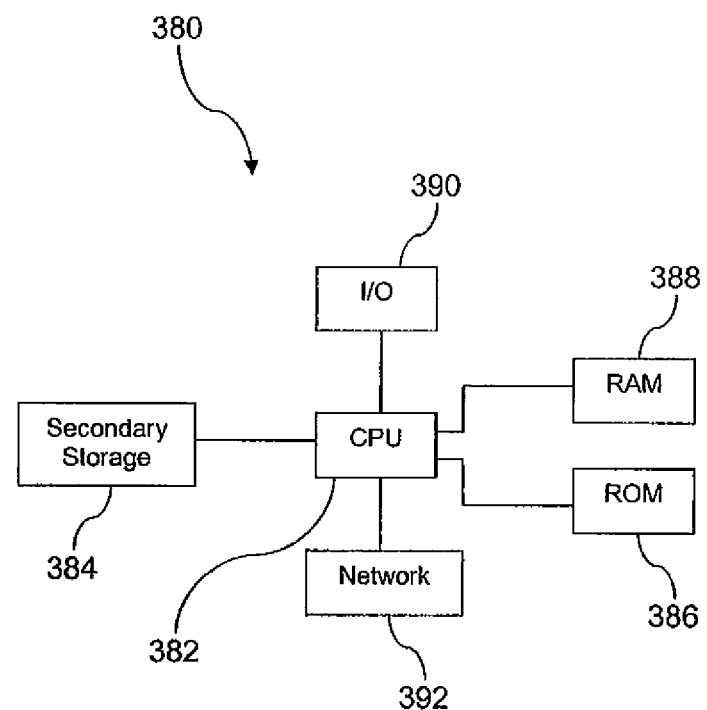
FIG. 7 illustrates a computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, the computer system 380 may comprise two or more computers in communication with each other that collaborate to perform a task. For example, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An automated method of selecting security actions, comprising:
    estimating a maximum forecast loss of an organization based on a valuation of the organization;
    identifying a first plurality of electronic threats as a plurality of general threats that threaten the organization when the first plurality of electronic threats is deemed to be directed at all users of technology;
    identifying a second plurality of electronic threats as a plurality of sector specific threats that threaten the organization when the second plurality of electronic threats is deemed to be directed to an industry sector in which the organization is active;
    identifying a third plurality of electronic threats as a plurality of targeted threats that threaten the organization when the third plurality of electronic threats is deemed to be directed specifically to the organization;
    collecting threat information for each of the first, second, and third pluralities of electronic threats, wherein the threat information for each of the first, second, and third pluralities of electronic threats comprises a threat score for the corresponding threat, wherein the threat score for the corresponding threat is determined based at least in part on whether the corresponding threat is a general threat, a sector specific threat, or a targeted threat, and wherein threat scores for each of the general threats, the sector specific threats, and the targeted threats are weighted differently;
    forecasting, by a computer, a security loss of the organization based on the estimated maximum forecast loss, based on the threat information associated with the general threats, based on the threat information associated with the sector specific threats, and based on the threat information associated with the targeted threats;
    estimating, by the computer, a reduction in the security loss of the organization based on a first investment in a countermeasure directed to the general threats;
    estimating, by the computer, a reduction in the security loss of the organization based on a second investment in a countermeasure directed to the sector specific threats;
    estimating, by the computer, a reduction in the security loss of the organization based on a third investment in a countermeasure directed to the targeted threats;
    determining, by the computer, a curve illustrating a functional relationship between a forecast loss versus security investment based at least in part on the maximum forecast loss of the organization, the reduction in the security loss of the organization based on the first investment, the reduction in the security loss of the organization based on the second investment, and the reduction in the security loss of the organization based on the third investment;
    presenting, by the computer, the curve on a display;
    modifying, by the computer, the curve based on a change in the threat information; and
    allocating, by the computer, at least a portion of a security investment budget of the organization among the first investment, the second investment, and the third investment based on the curve to maximize the estimated reduction in security loss of the organization.

2. The method of claim 1, further comprising:
    determining, by the computer, a second curve illustrating a second functional relationship between a second forecast loss versus security investment based at least in part on the maximum forecast loss of the organization; and
    presenting, by the computer, the second curve on the display.

3. The method of claim 1, wherein estimating the reduction in the security loss of the organization based on the first investment is further based on analyzing the distribution of the general threats across an electronic crime lifecycle.

4. The method of claim 1, wherein estimating the reduction in the security loss of the organization based on the second investment is further based on analyzing the distribution of the sector specific threats across a credential collection phase of an electronic crime lifecycle, a monetization phase of the electronic crime lifecycle, and a laundering phase of the electronic crime lifecycle.

5. The method of claim 4, wherein estimating the reduction in the security loss of the organization based on the third investment is further based on analyzing the distribution of the targeted threats across the credential collection phase, the monetization phase, and the laundering phase.

6. The method of claim 1, wherein the targeted threats comprise affiliate schemes, money laundering mule networks, counterfeiting of luxury goods, mass market malware, and escrow fraud.

7. The method of claim 1, wherein the sector specific threats comprise utilization of proxy botnet infrastructure to defeat anti-fraud countermeasures, adversary testing and discussion of anti-fraud countermeasures, single issue distributed denial of service attacks, and commercialization of a regional electronic crime marketplace.

8. The method of claim 2, further comprising:
    analyzing, by the computer, the general threats, the sector specific threats, and the targeted threats, wherein the general threats are associated with a general threat zone, the sector specific threats are associated with a sector specific threat zone, and the targeted threats are associated with a targeted threat zone;
    determining a relative magnitude of threats distributed among the general threat zone, the sector specific threat zone, and the targeted threat zone based on the analysis; and
    presenting a representation of the relative magnitude of threats distributed among the general threat zone, the sector specific threat zone, and the targeted threat zone on the display.

9. The method of claim 2, wherein determining the second functional relationship is further based on a current global electronic crime index.

10. The method of claim 9, wherein determining the second functional relationship is further based on at least one current regional electronic crime index.

11. The method of claim 2, wherein the second functional relationship is defined as a forecast loss versus security investment function, and further comprising:
    determining, by the computer, an operating point of the organization on the forecast loss versus security investment function based on a security investment by the organization;
    determining, by the computer, a rate of return for incremental security investment based on the forecast loss versus security investment function and based on the operating point of the organization relative to the forecast loss versus security investment function; and
    adjusting the security investment based on the determined rate of return.

* * * * *